United States Patent [19]

Fujii

[11] Patent Number: 4,750,917

[45] Date of Patent: Jun. 14, 1988

[54] METHOD OF AND APPARATUS FOR CLEANING AIR BY IRRADIATION OF ULTRAVIOLET RAYS

[75] Inventor: Toshiaki Fujii, Kanagawa, Japan

[73] Assignee: Ebara Research Co. Ltd., Japan

[21] Appl. No.: 920,987

[22] PCT Filed: Feb. 2, 1986

[86] PCT No.: PCT/JP86/00044

§ 371 Date: Nov. 21, 1986

§ 102(e) Date: Nov. 21, 1986

[87] PCT Pub. No.: WO86/04529

PCT Pub. Date: Aug. 14, 1986

[30] Foreign Application Priority Data

Feb. 4, 1985 [JP] Japan .................................. 60-18723

[51] Int. Cl.$^4$ ............................................... B01D 53/00

[52] U.S. Cl. ............................................ 55/6; 55/102; 55/279; 422/24

[58] Field of Search ................. 55/6, 102, 279, 385 A; 422/24, 121

[56] References Cited

U.S. PATENT DOCUMENTS

| | | | |
|---|---|---|---|
| 3,247,374 | 4/1966 | Wintermute | 422/24 X |
| 3,744,216 | 7/1973 | Hallovan | 55/102 |
| 3,948,625 | 4/1976 | Schultz | 55/102 |
| 4,477,263 | 10/1984 | Shaun et al. | 55/6 |
| 4,553,992 | 11/1985 | Boissinot et al. | 55/279 |
| 4,574,004 | 3/1986 | Schmidt-Ott et al. | 55/102 X |

FOREIGN PATENT DOCUMENTS

| | | |
|---|---|---|
| 38-23438 | 11/1963 | Japan . |
| 51-83278 | 7/1976 | Japan . |

OTHER PUBLICATIONS

Tohoku University Fundamental Electronics Introductory Course, vol. 13, "Photoelectric Device", Author Masanopu Wada, Published Dec. 15, 1959.

*Primary Examiner*—Charles Hart
*Attorney, Agent, or Firm*—Steinberg & Raskin

[57] ABSTRACT

A method of and an apparatus for cleaning the air by irradiating the air with ultraviolet rays to electrically charge the fine particles therein, and thereafter removing the charged fine particles from the air are disclosed. The cleaning method of the air (50) has the following steps: irradiating a photo-electron discharge member (21) with ultraviolet rays (22), electrically charging the above mentioned fine particles by using the photo-electrons generated due to this irradiation, and removing the fine particles charged by the photo-electrons from the air (50) by electrostatic filters (10, 24). The apparatus for practicing the method has an ultraviolet ray irradiation portion (9), photo-electron discharge portions (21) and a charged fine particle-collecting portion (10) on an air flow passage from an air intake port to an air exhaust port.

25 Claims, 1 Drawing Sheet

METHOD OF AND APPARATUS FOR CLEANING AIR BY IRRADIATION OF ULTRAVIOLET RAYS

BACKGROUND OF THE INVENTION

This invention relates to a method of and an apparatus for cleaning the air in clean rooms, clean booths, clean tunnels, clean benches, safety cabinets, aseptic rooms, bath boxes, aseptic air curtains, or clean tubes in the electronics industry, medicines industry, food industry, agricultural and forestry industries, medical facilities and precision machine industries.

Conventional air cleaning methods or apparatus in a room are generally classified into the following:

(1) a mechanical filter type (e.g., a HEPA filter), and (2) a filtering type which charges fine particles electrically at a high voltage and collecting the particles electrostatically by means of a conductive filter (e.g., a MESA filter).

These types have the following drawbacks:

In the mechanical filter type, it is necessary to use a fine filter to improve the quality (the cleaning class) of the air. In this case, the pressure loss is high, the increase in pressure loss due to clogging is remarkable, the lifetime of the filter is short, and the maintenance, the management and the exchange of the filter are complicated. When the filter is exchanged, it is necessary to stop working during the exchange, and it takes a long time to recover the system which deteriorates the production efficiency.

The number of times for ventilations (the number of times for circulating the air by a fan) is increased to improve the quality, i.e., to raise the cleaning class of the air, but the cost of power increases.

Since the only purpose of the conventional filter method is to remove fine particles, it can be used as an industrial clean room, but as the filter always has pinholes which leak part of the contaminated air, its use in a biological clean room is limited.

In the type for electrostatically collecting fine particles, a high voltage such as 15 to 70 kV is necessary in a preliminary charger to cause the system to increase in size, and there are safety, maintenance and management drawbacks.

In order to solve the above mentioned drawbacks, the inventor of the present invention has proposed an air cleaning system by irradiation of ultraviolet rays (Japanese Patent Application No. 216293/1984). Such a system is effective for a certain application field and utility, but is insufficient if applied to the purification of air containing ultrafine particles and any special field.

SUMMARY OF THE INVENTION

The present invention is a method of cleaning the air by irradiating the air with ultraviolet rays so as to electrically charge the fine particles therein and thereafter remove the charged fine particles from the air, comprising the steps of irradiating a photo-electron discharge member with ultraviolet rays, electrically charging the fine particles by using the photo-electrons generated due to this irradiation, and removing the fine particles charged by the photo-electrons from the air.

Further, in order to execute the above mentioned method, the present invention discloses an apparatus for cleaning the air comprising an ultraviolet ray irradiation portion, photo-electron discharge portions and a charged fine particle-collecting portion on an air flow passage from an air intake port to an air exhaust port.

As a preferred embodiment, there are provided a method of and an apparatus for charging fine particles in the air by photo-electrons generated due to the irradiation of ultraviolet rays to the photo-electron discharge members in an electric field.

As the photo-electron discharge members, there is preferably selected a substance having small photoelectric work function, a compound or alloy thereof to be used solely or as a composite material with two or more types.

Advantages of the invention include the following:

1. When the ultraviolet rays are irradiated to the photo-electron discharge members in an electric field applied with a relatively high voltage by the irradiation of the ultraviolet rays to the photo-electron discharge portions:
   (1) The charging of fine particles in the air can be efficiently performed as compared with the conventional electrostatic filter type;
   (2) Since the fine particles are efficiently charged, high quality air, i.e., air of high cleaning class can be provided merely by disposing a collector of suitable charged particles such as an electrostatic filter at the trailing stream side;
   (3) Since ultrafine particles are collected by electrically charging, a superclean room can be obtained; and
   (4) Since in comparison with the conventional electrostatic ultrafine particle collecting type, a high voltage is not necessary, it is safe and costs less to maintain and manage.
2. When sterilization is provided in the ultraviolet rays;
   (1) Sterilized clean air is obtained;
   (2) It is particularly effective in a field for affecting the influence of the presence of microorganism, like a biotechnologic field; and
   (3) The collection of charged particles may not be so restrictive in a biotechnologicl relation, i.e., small leakage is allowed to provide an inexpensive apparatus.
3. It is easy to attain an ultra-high quality air circumstances, i.e., cleaning class 1, cleaning class 10, which was not attainable in the conventional technique.

The other features and advantages of the present invention will become fully apparent by the following description when read in conjunction with the best mode for practicing the present invention shown in the accompanying drawings.

DESCRIPTION OF THE PREFERRED EMBODIMENTS

Figure 1:
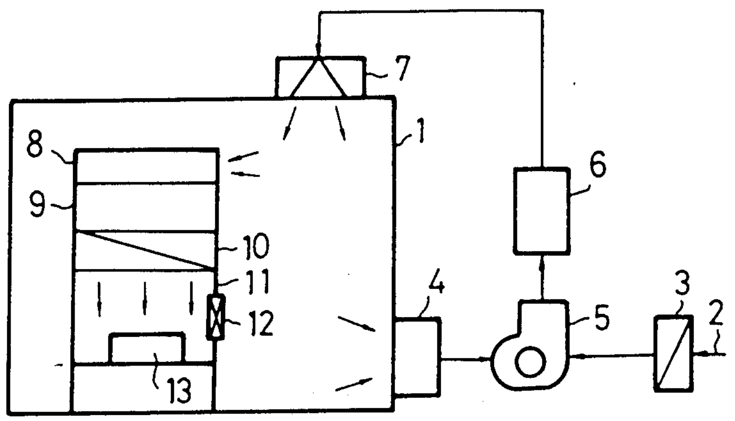
FIG. 1 is a schematic view of the type with a clean bench in a biological clean room, i.e., the type that a part in a working area is highly cleaned.

In a clean room 1, rough particles of atmospheric air fed from a conduit 2 are filtered by a prefilter 3, temperature and moisture are regulated by an air conditioner 6 through a fan 5 together with the air removed from an air intake port 4 of the room 1, fine particles are removed from the air by a HEPA filter 7, and the air is then circulated and supplied so as to be maintained in the cleaning class of approx. 10,000.

Aseptic atmospheric air of a high cleaning class (class 10) is held over a work base 13 in a clean bench 11 provided with a fan and a voltage supply unit 8, an ultraviolet ray irradiation portion 9 and a filter 10 in the room 1.

More particularly, in the clean bench 11, the air of the cleaning class of approx. 10,000 in the room 1 is intaken by the fan and the fan of the voltage supply unit 8, the ultraviolet rays are irradiated by the irradiation portion 9 to electrically charge the fine particles in the air and to sterilize microorganisms such as virus, bacteria, yeast or mold, the charged fine particles are then removed by the filter 10 to maintain the air in a high cleaning class above the work base 13.

Figure 2:
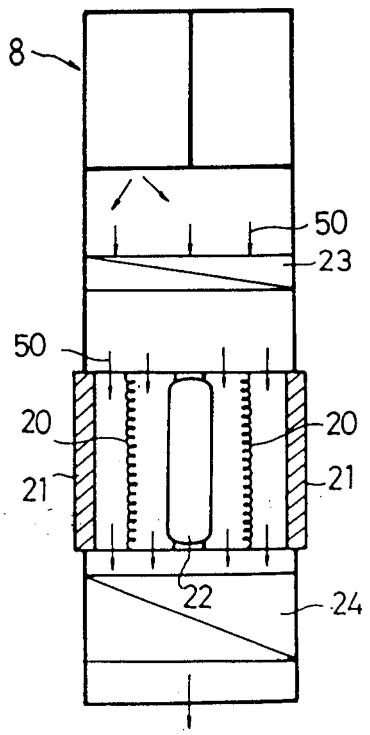
FIG. 2 is a schematic view showing an embodiment of an ultraviolet ray irradiating portion and a photoelectron discharge portion.

The ultraviolet ray irradiation portion and the photo-electron discharge portion are, as schematically shown in FIG. 2, mainly formed of a discharge electrode 20, the metal surface 21 of the photo-electron discharge member, and an ultraviolet ray lamp 22. A voltage is loaded from the fan and the voltage supply unit 8 to between the electrode 20 and the metal surface 21, the ultraviolet rays are irradiated by the lamp 22 to the metal surface 21, and the fine particles in the air 50 are efficiently charged by passing the air 50 between the electrode 20 and the metal surface 21.

The distance between the electrode 20 and the metal surface 21 is generally 2 to 20 cm per unit cell according to the shape of the apparatus, and 5 cm in this embodiment.

The material and the construction of the electrode 20 may be those ordinarily used in a charging device. In the embodiment described above, a tungsten wire is used. In FIG. 2, numeral 23 designates a rough filter, and numeral 24 is an electrostatic filter.

In the embodiment in FIG. 2, to form an electric field, the metal surface 21 and the electrode 20 of the photo-electron discharge portion are formed of separate materials. However, the metal surface 21 of the photo-electron discharge material may be used as the discharge electode. In this case, the electrode 20 is omitted from the example in FIG. 2, and the voltage is applied from the fan and the voltage supply unit 8 to the metal surface 21 of the photo-electron discharge member of material.

Then, the metal surface 21 may be any which generates photo-electrons by the irradiation of the ultraviolet rays, which is more preferable if having smaller photoelectric work function. From the point of view of both advantage and economy, any of Ba, Sr, Ca, Y, Gd, La, Ce, Nd, Th, Pr, Be, Zr, Fe, Ni, Zn, Cu, Ag, Pt, Cd, Pb, Al, C, Mg, Au, In, Bi, Nb, Si, Ta, Ti, Sn and P or compounds or alloys of them are preferable, and may be used solely or in combination of two or more of them. As a composite material, a physical composite material like amalgam may be employed.

For example, oxides, borides, and carbides are suitable compounds. The oxides include BaO, SrO, CaO, $Y_2O_6$, $Gd_2O_3$, $Nd_2O_3$, $ThO_2$, $ZrO_2$, $Fe_2O_3$, ZnO, CuO, $Ag_2O$, PtO, PbO, $Al_2O_3$, MgO, $In_2O_3$, BiO, NbO, and BeO; the borides include $YB_6$, $GdB_6$, $LaB_6$, $CeB_6$, $PrB_6$, and $ZrB_2$; and the carbides include ZrC, TaC, TiC and NbC.

The alloys include brass, bronze, phosphorus bronze, alloys of Ag and Mg (2–20 wt % of Mg), alloys of Cu and Be (1–10 wt % of Be) and alloys of Ba and Al. The alloys of Ag and Mg, Cu and Be and Ba and Al are preferable. Oxides can be obtained by heating only the metal surface in the air, or oxidizing the metal surface with medicine.

Another method involves heating the metal surface before using so as to form an oxide layer on the surface to obtain a stable oxide layer for a long period. As an example of this, the alloy of Mg and Ag is heatead at 300°–400° C. in steam to form a thin oxide film, thereby stabilizing the thin oxide film for a long period.

Shapes of the material which may be used include a plate shape, a brief shape, or a mesh shape in such a manner that the contacting area with the air and the irradiating surface of ultraviolet rays are preferably larger, and the mesh shape is more preferable from this standpoint.

The applied voltage is 0.1 to 10 kV, preferably 0.1 to 5 kV, and more preferably 0.1 to 1 kV, and the voltage depends upon the shape of the apparatus, the electrodes to be used or the material, the construction or the efficiency of the metal.

The types of the ultraviolet rays may be any of generating photo-electrons from the photo-electron discharge material by the irradiation, and preferably have sterilizing action. This may be suitably determined according to the applying field, working content, utility and economy. For example, in the biological field, far ultraviolet rays may be preferably contained from the standpoint of sterilizing action and high efficiency.

Charged fine particles which contain dead organisms are collected by the electrostatic filter 10. The collector of the charged particles may be any type, such as a dust collecting plate (dust collecting electrode) in an ordinary charging device or electrostatic filter type, and the collector itself of steel wool electrode is effective as the structure for forming the electrodes. The electrostatic filter type may be readily handled and effective at the points of performance and the economy. When the filter is used for a predetermined period, it may clog, and a cartridge structure may be employed as required to stably operate by replacing by the detection of the pressure loss for a long period.

The introduction and the removal of implements and products to the work base 13 in the bench 11 can be performed by a movable shutter 12 provided in the bench 11.

As charging type of fine particles in the air, there has been described the type for discharging photo-electrons by irradiating the ultraviolet rays to the photo-electron discharge metal surface in an electric field applied with relatively high voltage. However, fine particles in the air may be charged by irradiating the ultraviolet rays to the photo-electron discharge material without forming an electric field. In this case, in the embodiments in FIGS. 1 and 2, the construction for forming the electric field may be omitted.

The positional relationship of the fan, ultraviolet ray lamp, electric field, and the photo-electron discharge material in the present invention depends upon the type of air cleaning method, scale of the air cleaning method and air flowing method, and are not limited to the particular embodiments.

There are two types of air cleaning methods. One highly cleans part of a working area; the second highly cleans an entire room. The former is generally more economic.

When the present invention is applied to the field of biotechnology, nitrogen plenty air proposed by the inventor of the present invention is effectively employed. (Refer to Japanese Patent Application No. 216293/1984.)

What is claimed is:

1. A method for cleaning a gas, comprising the steps of irradiating a photo-electron discharge member formed of material having small photoelectric work function, with ultraviolet rays from an ultraviolet ray source, loading a voltage between an electrode and said photo-electron discharge member, to thereby create an electric field therebetween, passing the gas between said source and member whereby fine particles in the gas become electrically charged due to photo-electrons emitted by said photo electron discharge member, and removing the thus-electrically charged particles from the gas downstream of the electrical charging thereof, whereby the creation of the electric field enhances the electrical charging of the particles.

2. A method according to claim 1 wherein said photo-electron discharge member is formed of material selected from a group consisting of Ba, Sr, Ca, Y, Gd, La, Ce, Nd, Th, Pr, Be, Zr, Fe, Ni, Zn, Cu, Ag, Pt, Cd, Pb, Al, C, Mg, Au, In, Bi, Nb, Si, Ta, Ti, Sn and P, and compounds or alloys thereof.

3. A method according to claim 1 wherein said photo-electron discharge member is formed of a composite material of at least two substances selected from the group consisting of Ba, Sr, Ca, Y, Gd, La, Ce, Nd, Th, Pr, Be, Zr, Fe, Ni, Zn, Cu, Ag, Pt, Cd, Pb, Al, C, Mg, Au, In, Bi, Nb, Si, Ta, Ti, Sn and P, and compounds thereof.

4. A method according to claim 1 wherein said photo-electron discharge member is formed of an alloy of Ag and Mg.

5. A method according to claim 1 wherein said photo-electron discharge member is formed of an alloy of Cu and Be.

6. A method according to claim 1 wherein said photo-electron discharge member is formed of an alloy of Ba and Al.

7. A method according to claim 1 wherein said photo-electron discharge member is formed of a material selected from the group consisting of brass, bronze and phosphorus bronze.

8. A method according to claim 1 wherein said photo-electron discharge member is of mesh shape.

9. The method of claim 1, wherein said electrical field has a voltage of 0.1 to 10 kv.

10. A method according to claim 9, wherein said electric field voltage is 0.1 to 5 kV.

11. The method of claim 10, wherein said electrical field voltage is 0.1 to 1 kV.

12. The method of claim 1, wherein said thus-electrically charged particles are removed from said gas by passing said gas through an electrostatic filter after said electrical charging of said fine particles.

13. The method of claim 1, wherein said electrode is positioned between said source and member and is spaced from said source.

14. The method of claim 1, comprising the additional steps of pre-filtering the gas before said electrical charging of said fine particles.

15. The method of claim 1, wherein distance between said electrode and a surface of said photo-electron discharge member is about 2 to 20 cm.

16. The method of claim 15, wherein the distance between said electrode and the surface of said member is about 5 cm.

17. Apparatus for cleaning a gas, comprising an ultra-violet irradiation source and a photo-electron discharge member disposed across a passage for the gas from said source, whereby fine particles in the gas flowing between said source and member are electrically charged by photo-electrons discharged from said photo electron discharge member, an electrode for loading a voltage between the same and said photo-electron discharge member, to thereby create an electrical field across said passage, and means for collecting the thus-charged particles from the gas, being positioned downstream of said source and member, whereby the electrical field enhances the electrical charging of the particles.

18. The apparatus of claim 17, wherein said collecting means comprise an electrostatic filter positioned in said passage.

19. The apparatus of claim 18, additionally comprising a pre-filter positioned in said passage upstream of said source and member.

20. The apparatus of claim 17, wherein said electrode is positioned between said source and member and is spaced from said source.

21. The apparatus of claim 17, wherein said electrical field has a voltage of 0.12 to 10 kV.

22. The apparatus of claim 21, wherein said electric field voltage is 0.1 to 5 kV.

23. The apparatus of claim 22, wherein said electric field voltage is 0.1 to 1 kV.

24. The apparatus of claim 17, wherein distance between said electrode and a surface of said photo-electron discharge member is about 2 to 20 cm.

25. The apparatus of claim 24, wherein the distance between said electrode and the surface of said member is about 5 cm.

* * * * *